United States Patent
Quintero Ramirez

(10) Patent No.: US 11,086,992 B2
(45) Date of Patent: Aug. 10, 2021

(54) SCANNING FILES USING ANTIVIRUS SOFTWARE

(71) Applicant: VirusTotal SLU, Dublin (IE)

(72) Inventor: Jose Bernardo Quintero Ramirez, Velez-Malaga (ES)

(73) Assignee: VirusTotal SLU

( * ) Notice: Subject to any disclaimer, the term of this patent is extended or adjusted under 35 U.S.C. 154(b) by 53 days.

(21) Appl. No.: 16/175,648

(22) Filed: Oct. 30, 2018

(65) Prior Publication Data

US 2019/0130105 A1    May 2, 2019

(30) Foreign Application Priority Data

Oct. 30, 2017  (EP) .................................. 17382728

(51) Int. Cl.
 *G06F 21/56*   (2013.01)
 *G06F 3/0482*  (2013.01)
 *H04L 12/24*   (2006.01)

(52) U.S. Cl.
 CPC .......... *G06F 21/561* (2013.01); *G06F 3/0482* (2013.01); *G06F 21/56* (2013.01); *G06F 21/564* (2013.01); *H04L 41/22* (2013.01)

(58) Field of Classification Search
 CPC ...... G06F 21/56; G06F 21/564; G06F 21/565; G06F 21/561; G06F 21/566; H04L 63/14; H04L 63/1408; H04L 41/22
 See application file for complete search history.

(56) References Cited

U.S. PATENT DOCUMENTS 10,853,058 B1 * 12/2020 Ouzan ..................... G06F 21/51
2009/0044024 A1   2/2009 Oberheide et al.
(Continued)

FOREIGN PATENT DOCUMENTS

EP           2763069        8/2014

OTHER PUBLICATIONS

'www.av-comparatives.org' [online] "Independent Test of Anti-Virus Software," Aug. 24, 2017, [retrieved on Mar. 1, 2018] Retrieved from Internet: URLhttps://web.archive.org/web/20170824154210/https://www.av-comparatives.org/compartives-reviews/> 3 pages.

(Continued)

*Primary Examiner* — Kristine L Kincaid
*Assistant Examiner* — Shaqueal D Wade
(74) *Attorney, Agent, or Firm* — Fish & Richardson P.C.

(57) ABSTRACT

Methods, systems, and apparatus, including computer programs encoded on a computer storage medium, for identifying, by a file analysis system, a plurality of files that have been uploaded by a user to a particular folder that has been allocated to the user in a file storage service; scanning, by the file analysis system, each of the plurality of files using each of a plurality of antivirus software programs; in response to the scanning, determining that a particular file of the plurality of files is indicated as potentially malicious by a particular antivirus software program of the plurality of antivirus software programs; and providing a notification to a vendor of the particular antivirus software program indicating that the particular file has been indicated as potentially malicious by the particular antivirus software program.

20 Claims, 12 Drawing Sheets

(56) References Cited

U.S. PATENT DOCUMENTS

| | | | |
|---|---|---|---|
| 2009/0313699 A1* | 12/2009 | Jang | G06F 21/554 |
| | | | 726/23 |
| 2013/0074185 A1 | 3/2013 | McDougal et al. | |
| 2013/0318610 A1* | 11/2013 | Zaitsev | G06F 21/566 |
| | | | 726/24 |
| 2014/0337410 A1* | 11/2014 | Mraz | H04L 63/20 |
| | | | 709/203 |
| 2016/0149943 A1* | 5/2016 | Kaloroumakis | H04L 63/1416 |
| | | | 726/23 |

OTHER PUBLICATIONS

'www.virusbulletin.com' [online] "VB100 Methodology—ver.1," Oct. 5, 2017, [retrieved on Mar. 1, 2018] Retrieved from Internet: URL<https://web.archive.org/web/20171005032113/https://www.virusbulletin.com/testing/vb100/vb100-methodology/vb100-methodology/ver1/> 7 pages.

EP Extended European Search Report issued in European Application No. 17382728.8, dated Mar. 9, 2018, 9 pages.

EP Office Action in European Appln. 17382728.8-1218, dated May 6, 2019, 2 pages.

* cited by examiner

SCANNING FILES USING ANTIVIRUS SOFTWARE

CROSS-REFERENCE TO RELATED APPLICATION

This application is based upon and claims the benefit of priority of the prior European Patent Application No. 17382728.8, filed on Oct. 30, 2017, the entire contents of which is incorporated herein by reference.

BACKGROUND

This specification generally relates to scanning files using antivirus software programs.

Antivirus software programs scan files to detect malware using various detection techniques and algorithms. The management of the scanning process for multiple files affects the efficiency and processing time of the files.

SUMMARY

Malware often disrupts computer operations and gathers private or sensitive information of users or organizations without permission. Antivirus software is used to detect malware. Different antivirus software may use different detection techniques and algorithms; in some examples, a malware file may be detected by one antivirus program and not by a different antivirus program. By analyzing a file using multiple different antivirus software programs, both false negatives in which malicious content is not detected and false positives in which innocuous content is flagged may be reduced.

Innovative aspects of the subject matter described in this specification may be embodied in methods that include the actions of identifying, by a file analysis system, a plurality of files that have been uploaded by a user to a particular folder that has been allocated to the user in a file storage service; scanning, by the file analysis system, each of the plurality of files using each of a plurality of antivirus software programs; in response to the scanning, determining that a particular file of the plurality of files is indicated as potentially malicious by a particular antivirus software program of the plurality of antivirus software programs; and providing a notification to a vendor of the particular antivirus software program indicating that the particular file has been indicated as potentially malicious by the particular antivirus software program.

Other embodiments of these aspects include corresponding systems, apparatus, and computer programs, configured to perform the actions of the methods, encoded on computer storage devices.

These and other embodiments may each optionally include one or more of the following features. For instance, the notification further includes metadata associated with the particular file. In response to the scanning, determining a status of the particular file that is indicated by the remaining antivirus software programs of the plurality of antivirus software programs. The notification further includes data indicating the status of the particular file for at least a subset of the remaining antivirus software programs. Determining that the plurality of files have finished uploading to the particular folder, wherein identifying the plurality of files and scanning each of the plurality of files is in response to determining that the plurality of files have finished uploading to the particular folder. The scanning is performed periodically with a most recent signature for each antivirus software program. Providing an additional notification to the user associated with the particular folder indicating that the particular file has been indicated as potentially malicious by the particular antivirus software program.

The features further include, for example, providing for display a graphical user interface (GUI) to a computing device associated with the user, the GUI providing display data indicating a potential malware status of a subset of files of the plurality of files of the folder. The data indicates the potential malware status of the subset of files further includes, for each file of the subset, data indicating a number of the antivirus software programs that indicate the file as potentially malicious. The data indicates the potential malware status of the subset of files further includes, for each file of the subset, a listing of the antivirus software programs that indicate the file as potentially malicious. The data indicates the potential malware status of the subset of files further includes, for each file of the subset, a listing of the remaining antivirus software programs that indicate the file as safe. The data indicates the potential malware status of the subset of files further includes, for each file of the subset, a historical trend of the potential malware status of the file. The GUI further provides display of a listing of a subset of the files indicated as potentially malicious, the listing sorted by a date of initial detection of each the subset of files as potentially malicious. The GUI further provides display of a listing of each of the plurality of antivirus software programs, the listing sorted by a quantity of detections of files indicated as potentially malicious by each antivirus software program. The GUI further provides filtering graphical user interface elements to toggle filtering of the files based on the status of each file. Scanning, by the file analysis system, each of the plurality of files using each of the plurality of antivirus software programs at a first time, wherein each of the plurality of antivirus software programs utilize, at the first time, a respective initial signature for scanning each of the plurality of files.

These and other embodiments may each optionally include one or more of the following features. For instance, by scanning files for potential malware by multiple antivirus software programs, when one or a few of the antivirus software programs identify a file as potentially malicious (e.g., out of dozens of antivirus programs), the vendor of such antivirus programs can be notified of such anomaly. The vendor can then reassess the antivirus software program, and update the signature employed if needed. By doing such, false-positive identification of files as potentially malicious can be reduced. By reducing identification of false-positives of files, computing resources are utilized more efficiently to properly identify files that are malicious, and thus, increasing a security of client computing devices. Additionally, by reducing identification of false-positives, the total scan time of files can be reduced, allowing the computing resources to scan more files, and/or scan the files more frequently.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
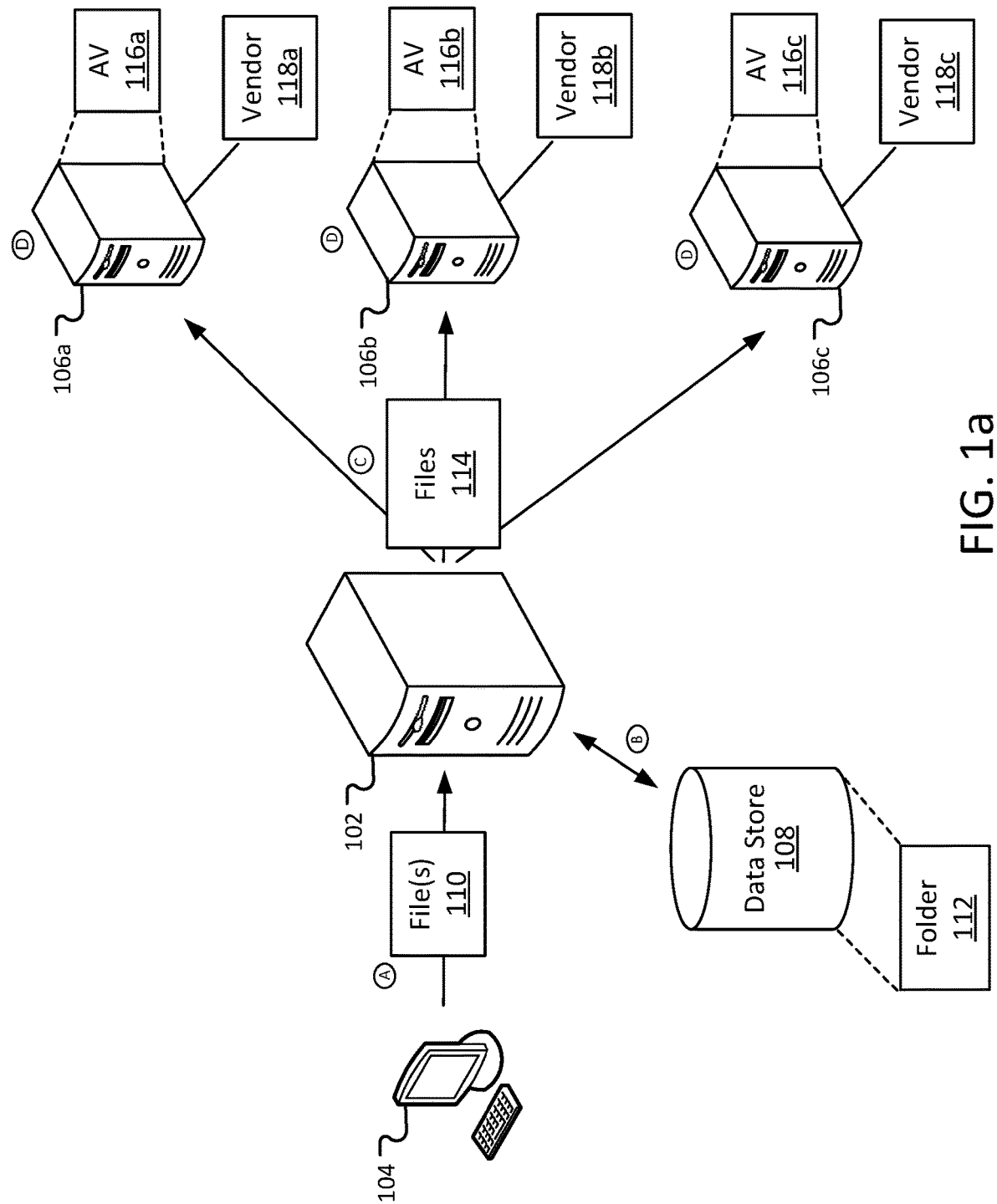
FIGS. 1A-1E illustrate an example system for scanning of files for identification of potential malware.

This document generally describes techniques for scanning of files for identification of potential malware. In some examples, files that have been uploaded by a user are identified. Each of the files are scanned using each of multiple antivirus software programs. In some cases, it is determined that a particular file (of the files) is indicated as potentially malicious by an antivirus software program. A notification is provided to a vendor of the antivirus software program indicating that the particular file has been indicated as potentially malicious.

FIGS. 1A-1E illustrate a system 100 for scanning of files for identification of potential malware. The system 100 includes a server computing system 102, a client computing device 104, computing units 106a, 106b, 106c (collectively referred to as computing units 106), and a data store 108. The client computing device 104 is in communication with the server computing system 102 over one or more networks. The server computing system 102 is in communication with the computing units 106 over one or more networks. In some examples, the server computing system 102, the computing units 106, and the data store 108 are collectively referred to as a file analysis system. In some examples, the data store 108 is referred to as a file storage service. In some examples, the data store 108 can include one or more physical storage devices located in one or more physical locations.

Each of the computing units 106 includes (or is assigned) an antivirus software program (AV) 116—e.g., the computing unit 106a includes AV 116a, the computing unit 106b includes AV 116b, and the computing unit 106c includes AV 116c. However, the number of computing units 106 and AVs 116 can vary, and is dependent upon the specific implementation. Furthermore, each of the computing units 106 can be associated with a vendor 118—e.g., the computing device 106a is associated with a vendor 118a, the computing device 106b is associated with a vendor 118b, and the computing device 106c is associated with a vendor 118c. The vendors 118 are entities that provide the respective AV 116 of each computing device 106, e.g., the vendors 118 are the software developers of the respective AVs 116.

In some implementations, referring to FIG. 1A, the client computing device 104 provides files 110 (or a singular file 110) to the server computing system 102, at step A. For example, the client computing device 104 access a portal (e.g., via a client-specific web page) to provide (e.g., upload) the files 110, described further herein. The server computing system 102 obtains the files 110 and stores the files in the data store 108, at step B. For example, the data store 108 includes multiple storage partitions—e.g., folders. Each of the folders can be allocated to differing users—e.g., the server computing system 102 can allocate a particular folder 112 (of multiple folders) of the data store 108 to the client computing device 104. The client computing device 104 can access the particular folder 112 and provide (upload) the files 110 to the particular folder 112. In some examples, the user can include a single person, multiple persons, or an organization of people.

In some examples, the server computing system 102 identifies files 114 stored within the particular folder 112 by the data store 108. For example, the files 114 can include the files 110, or a subset of the files 110. The server computing system 102 provides the files 114 to each of the computing units 106, at step C. Each of the computing units 106 scans each of the files 114 using the respective AV 116, at step D. For example, scanning of the files 116 includes, for each of the computing units 106, scanning, at a first time, the files 116 against an initial signature (e.g., an algorithm, hash, or a unique string of bits that identifies malicious software) associated with the respective AV 116. In some examples, scanning of the files 116 includes, for each of the computing units 106, scanning the files 116 with a most recent signature associated with the respective AV 116. In some examples, the server computing system 102 can determine that the files 110 have finished uploading to the particular folder 112 (e.g., in response to user-provided input), and in response, provide the files 114 to each of the computing units 106 for scanning thereof.

Figure 1B:
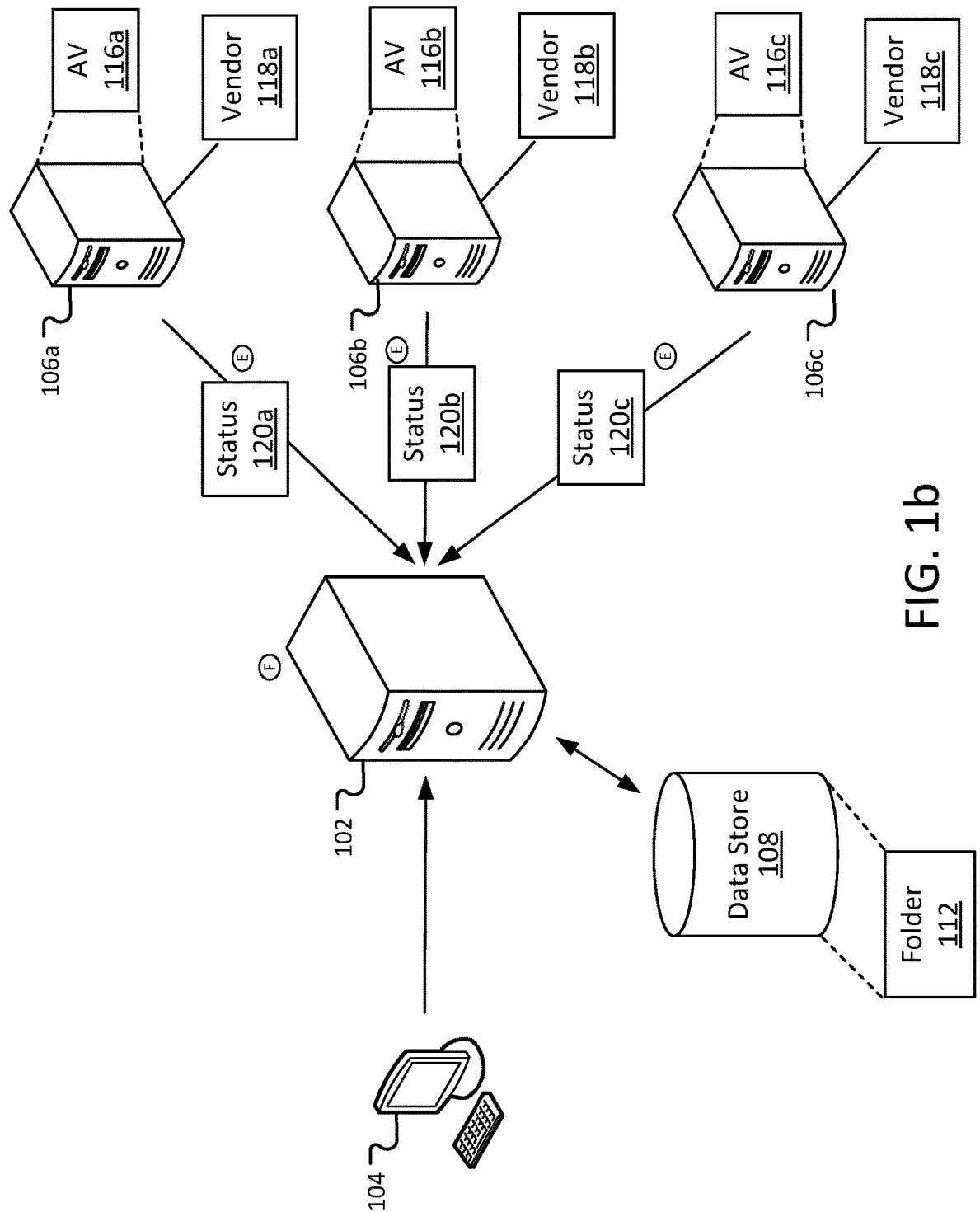

Referring to FIG. 1B, each of the computing devices 106 provides a status 120 to the server computing system 102, at step E. That is, in response to the computing units 106 scanning each of the files 114 using the respective AVs 116, each of the computing devices 106 determines the status of each of the files 114—e.g., a status that indicates a potential malicious state of the files 114, described further herein. For example, the computing device 106a and the AV 116a provide the status 120a to the server computing system 102; the computing device 106b and the AV 116b provide the status 120b to the server computing system 102; and the computing device 106c and the AV 116c provide the status 120c to the server computing system 102.

In some examples, the status of each file 114 includes a state of the respective file 114 in view of the respective AV 116. For each file 114, the state can include an indication of whether the file 114 includes malicious content as determined by the respective AV 116. In some examples, the indication is a binary indication that indicates whether the file 114 does or does not contain malicious content. In some examples, the indication may be in the form of scores for various portions of the file 114, an identification of the portions of the file 114 that include malicious content, an identification of the type of malicious content the file 114 contains, or any of various other indications of whether the file 114 includes malicious content. The indication can further include data characterizing the associated AV 116, e.g., the name of the program, the version of the program, the version of the signature files being used by the program, and so on.

The server computing system 102 determines that a particular file 115 of the files 114, shown in FIG. 1A, is indicated as potentially malicious by a particular AV 116, at step F. That is, one of the statuses 120 received from the computing devices 106 indicates that the associated AV 116 has indicated that the particular file 115 is potentially malicious. For example, the AV 116a has indicated the particular file 115 is potentially malicious, and the computing device 106a has provided the status 120a to the server computing system 102 indicating such.

Figure 1C:
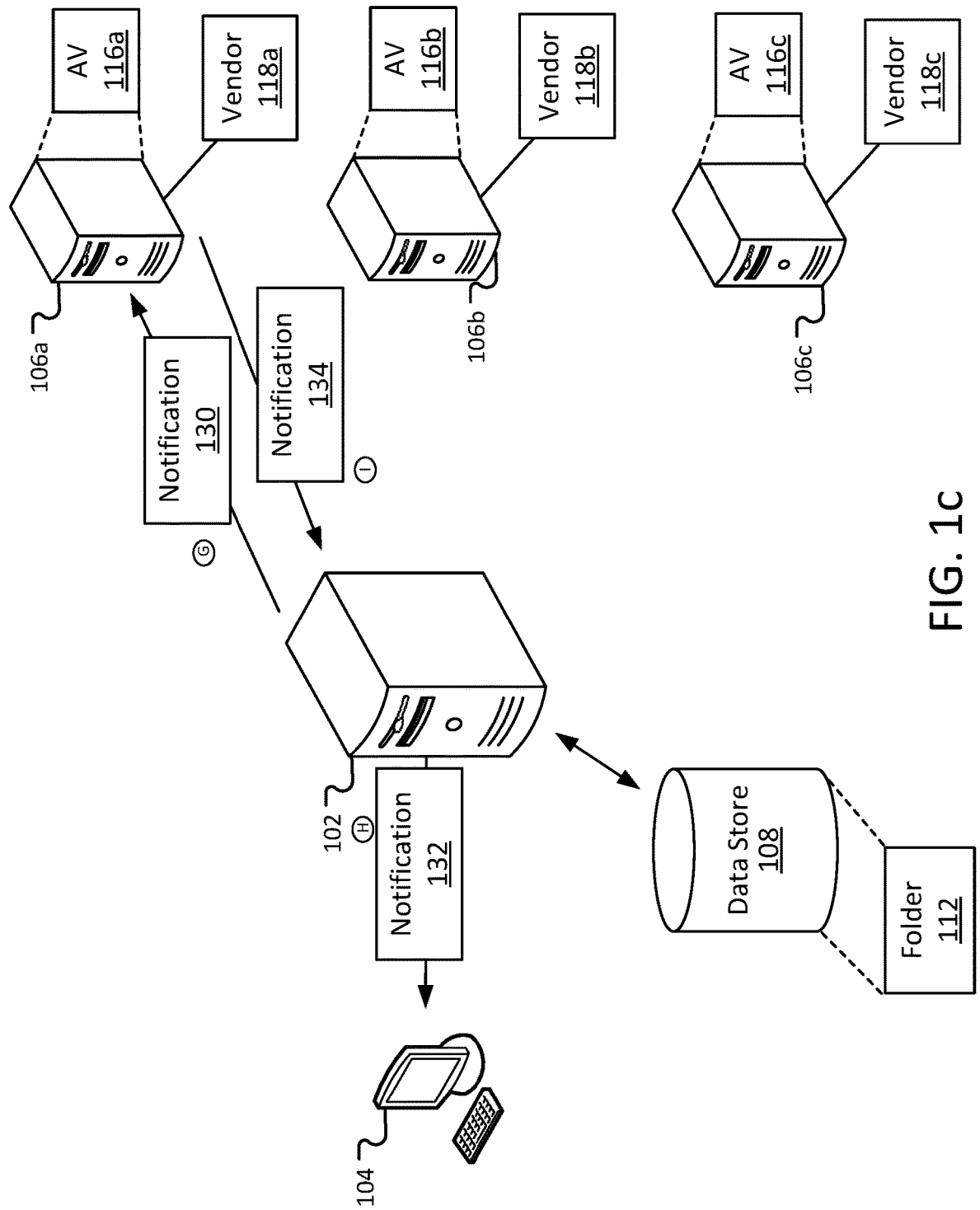

Referring to FIG. 1C, the server computing system 102 provides a notification 130 to the computing device 106, and in particular, the vendor 118 of the particular AV 116 that indicated the particular file 115 as potentially malicious, at step G. For example, the server computing system 102 provides the notification 130 to the vendor 118*a* associated with the AV 116*a* that indicated the particular file 115 as potentially malicious. In some examples, the notification 130 can include metadata associated with the particular file 115. The metadata can include a name, size, creator, last analysis (scan), last analysis (scan) detection, location, details, and analysis frequency of the particular file 115. In some examples, the notification 130 can include data indicating the statuses 120 of the particular file 115 that are provided by the remaining AVs 116 and computing devices 106. For example, the notification 130 can include data indicating the status 120*b* that indicates the potential maliciousness as indicated by the AV 116*b* and data indicating the status 120*c* that indicates the potential maliciousness as indicated by the AV 116*c*. Thus, the computing device 106*a* associated with the AV 116*a* is able compare the indicated status 120*a* of the particular file 115 against the statuses 120*b*, 120*c* of the particular file 115 as indicated by the AV 116*b*, 116*c*, respectively. Specifically, by doing such comparison, the computing device 106*a* can determine whether the status 120*a* is aligned with or differs from the statuses 120*b*, 120*c*. In some examples, by having such info, in particular, if the status 120*a* differs from the statuses 120*b*, 120*c*, the computing device 106*a* can adjust parameter(s) associated with scanning of the particular file, including updating a signature of the AV 116*a*.

The server computing system 102 provides a notification 132 to the client computing device 104, at step H. In some examples, the notification 132 can include an indication that the particular file 115 has been indicated as potentially malicious by the AV 116*a*, described further herein. In some examples, the notification 132 can include metadata associated with the particular file, such as a name, size, creator, last analysis (scan), last analysis (scan) detection, location, details, and analysis frequency of the particular file 115.

Optionally, the computing device 106 provides a notification 134 to the server computing system 102, at step I. For example, the computing device 106*a*, and in particular the vendor 118*a* of the AV 116*a*, provides the notification 134 to the server computing system 102. The notification 134 can include data that the indication of the particular file 115 as potentially malicious by the AV 116*a* is a false-positive indication. That is, the notification 134 can indicate that the indication of the particular file 115 as potentially malicious by the AV 116*a* was incorrect, or falsely identified as malicious.

Figure 1D:
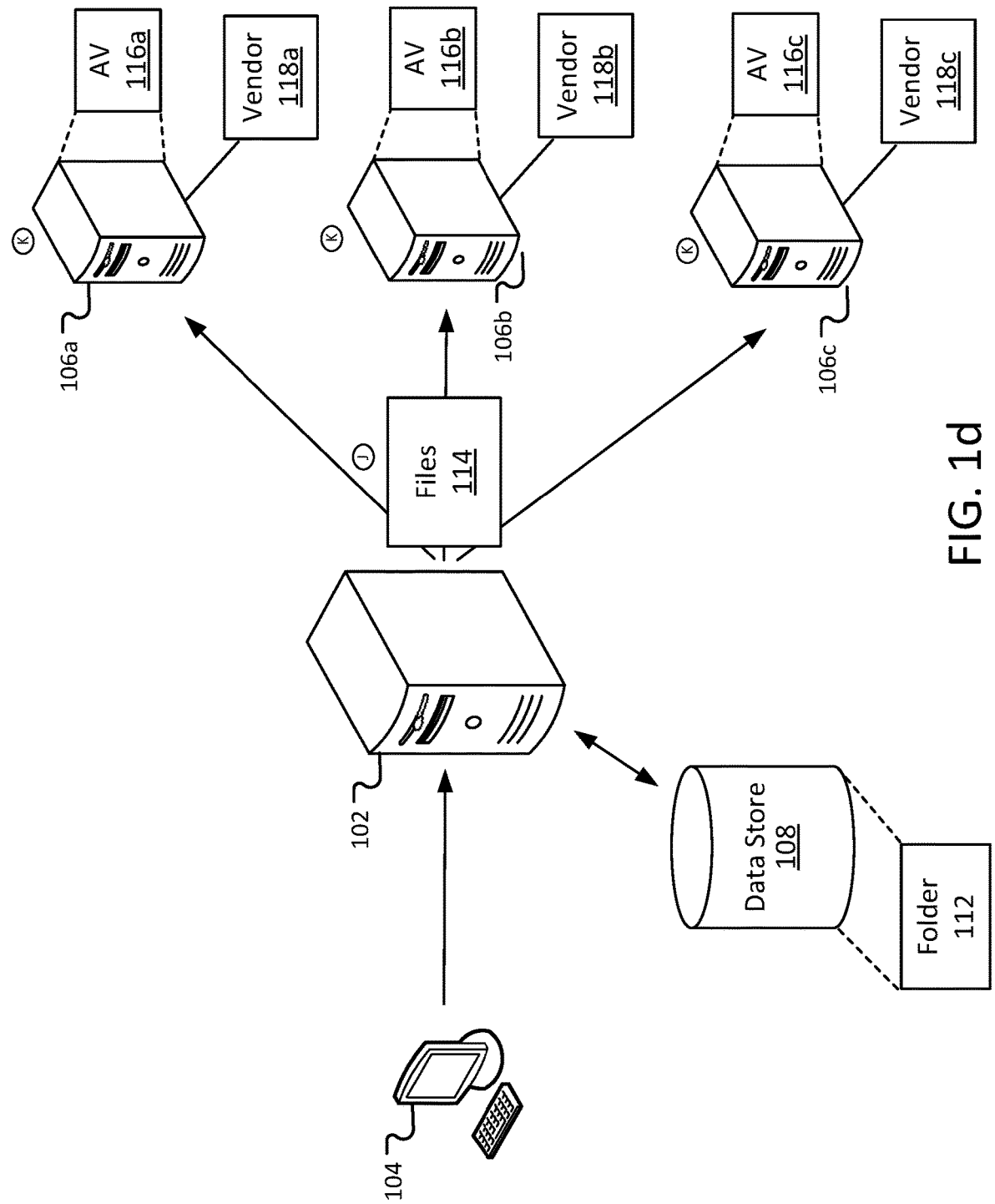

Referring to FIG. 1D, the server computing system 102 provides the files 114 again to each of the computing units 106, at step J. Each of the computing units 106 scans each of the files 114 again using the respective AVs 116, at step K. For example, scanning of the files 114 includes, for each of the computing units 106, scanning, at a second time subsequent to the first time, the files 114 against a signature associated with the respective AVs 116. In some examples, the AV 116*a* is associated with an updated signature, e.g., in response to the notification 130. That is, the vendor 118*a* has updated the signature associated with the AV 116*a*, with the AV 116*a* utilizing the updated signature when scanning the files 114 at the second time.

Figure 1E:
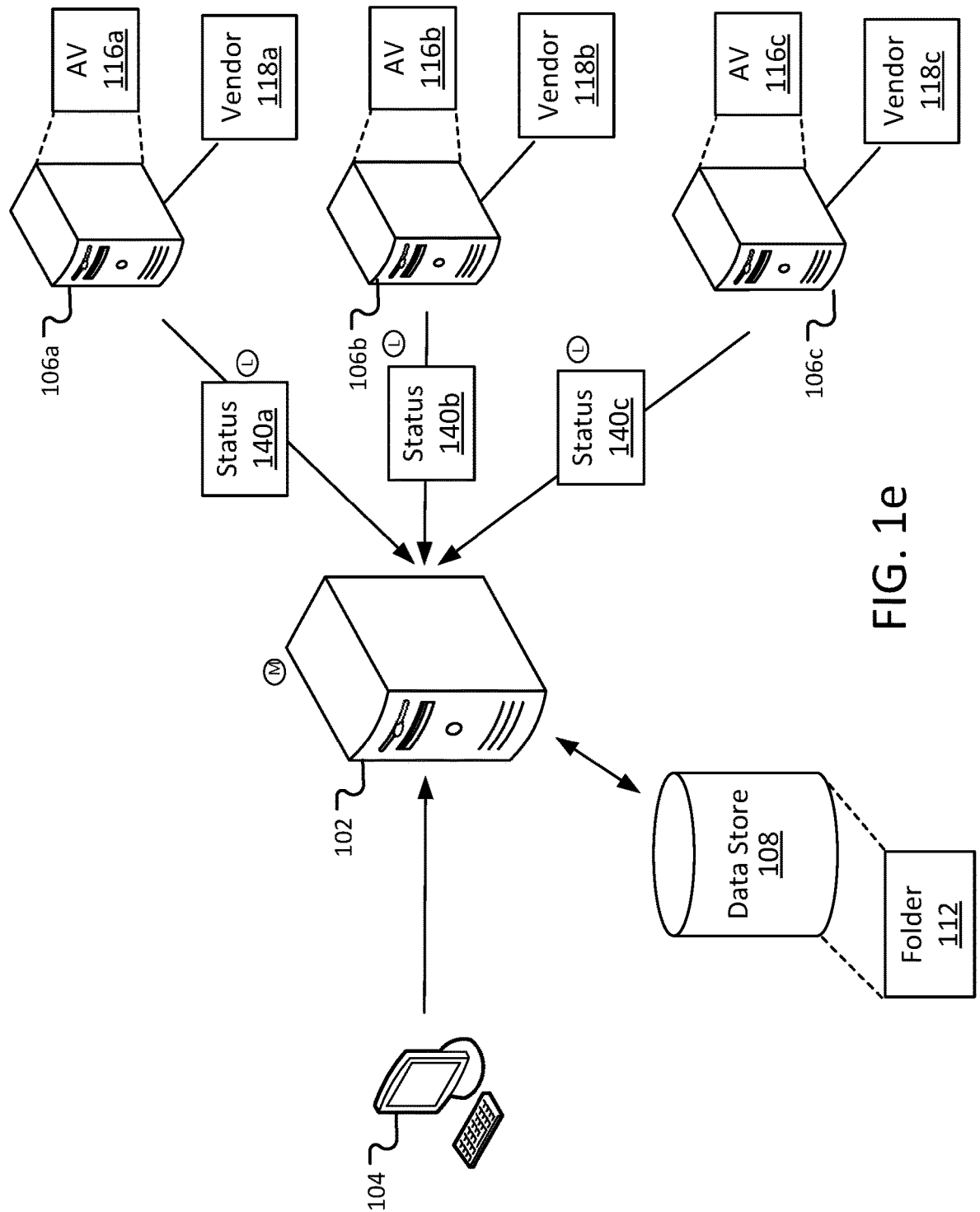

Referring to FIG. 1E, each of the computing devices 106 provides a status 140 to the server computing system 102, at step L. That is, in response to the computing units 106 re-scanning each of the files 114 using the respective AVs 116, each of the computing devices 106 determines the status of each of the files 114—e.g., a potential malicious state of the files 114. For example, the computing device 106*a* and the AV 116*a* provide the status 140*a* to the server computing system 102; the computing device 106*b* and the AV 116*b* provide the status 140*b* to the server computing system 102; and the computing device 106*c* and the AV 116*c* provide the status 140*c* to the server computing system 102. In some examples, the status of each file 114 includes a state of the respective file 114 in view of the respective AV 116. For each file 114, the state can include an indication of whether the file 114 includes malicious content for as determined by the respective AV 116.

The server computing system 102 determines that particular file 115 of the files 114 is not indicated as potentially malicious by each of the AVs 116, at step M. That is, each of the statuses 140 received from the computing devices 106 indicate that each of the associated AVs 116 has indicated that the particular file 115 is not potentially malicious. For example, the AV 116*a* has now (e.g., in response to the re-scan at the second time) indicated the particular file 115 is not potentially malicious, and the computing device 106*a* has provided the status 140*a* to the server computing system 102 indicating such. In some examples, in response to the re-scanning of the files 114, the server computing system 102 stores data that identifies the particular file 115 as safe by each of the AVs 116.

Figure 2:
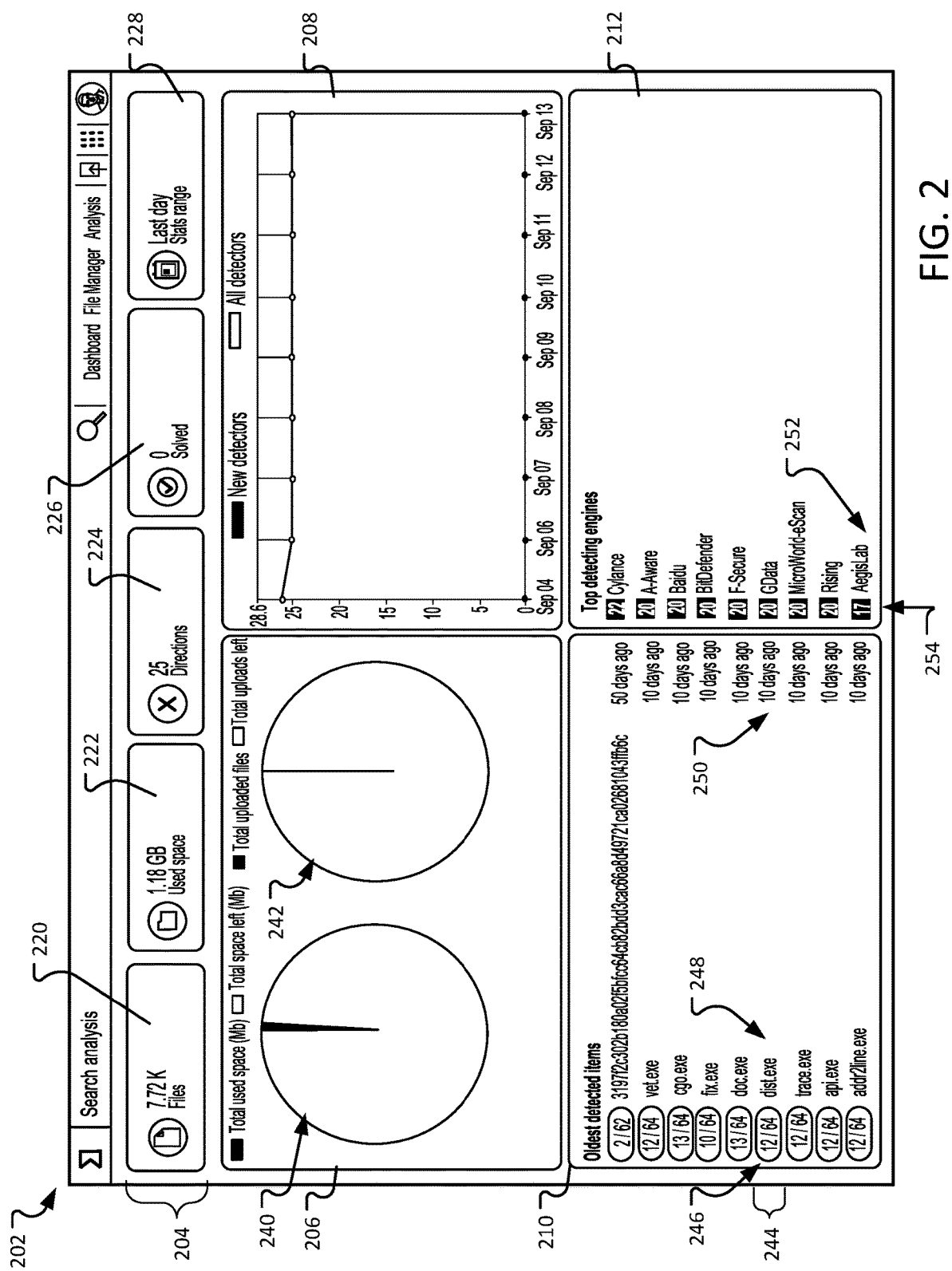
FIGS. 2-6 illustrate graphical user interfaces for displaying data indicating a potential malware status of files.

FIG. 2 illustrates a GUI of a dashboard 202 provided to the client computing device 104 for display. The dashboard 202 includes a quick summary portion 204, a folder storage portion 206, a detection timeline 208, a detected item listing 210, and an AV detection listing 212. In short, the dashboard 202 provides an overview of the files of the folder 112, and information of the files in view of scans of the files of the folder 112 by AVs (e.g., the AVs 116).

The quick summary portion 204 provides a quick summary/overview of the folder 112, and includes a file summary interface element 220, a storage summary interface element 222, a detection interface element 224, a solved interface element 226, and a date interface element 228. The file summary interface element 220 provides data displaying a total number of files (e.g., 7.72 k files) included by the folder 112 (e.g., files currently be monitored by the system 100). The storage summary interface element 222 provides data displaying a total storage (e.g., 1.18 GB) of the folder 112. The detection interface element 224 provides data displaying a total number (e.g., 25 detections) of potentially malicious detections of the files of the folder 112. The solved interface element 226 provides data displaying a total number of previously detected files of the folder 112 as potentially malicious that were subsequently detected as safe (e.g., 0 detections). The date interface element 228 provides data displaying a date associated with the data displayed by the quick summary portion 204 (e.g., the "last day"). In some examples, selecting one of the elements of the quick summary portion 204 (e.g., through "clicking" enabled by a input device) can provide a further display of data related to the selected element—e.g., a new web page or a new window is provided for display. For example, selecting the file summary interface element 220 can provide display of data related to the files of the folder 112, e.g., within the GUI 200.

The folder storage portion 206 provides a graphical representation 240 of the storage allotment of the folder 112—e.g., total used space versus total space left; and further provides a graphical representation 242 of the number of files of the folder 112—e.g., total uploaded files versus total uploads remaining. The detection timeline 208 provides a graphical representation of potentially malicious detections of the files of the folder 112 over a period of time, including displaying data of total detections and new detections.

The detected item listing 210 provides data displaying a listing of files of the folder 112 as indicated as potentially malicious (e.g., by one or more of the AVs). For example, for a file 244, the detected item listing 210 provides display of a number 246 of AVs detecting the file 244 as potentially malicious, a name 248 of the file 244, and a date 250 of the oldest detection by an AV of the file 244 as potentially malicious. In some examples, the listing 210 is sorted by a data of initial detection of each of the files of the folder 112. For example, the listing 210 is sorted such that the file with the oldest initial detection is displayed at a top of the list 210.

The AV detection listing 212 provides data display a listing of each of the AVs used in scanning of the files of the folder 112. For example, for an AV 252 (e.g., AV 252 being one of the AVs 116), the listing 212 provides display of a number 254 of detections of files of the folder 112 as potentially malicious. In some examples, the listing 212 is sorted by a quantity of detections of the files of the folder 112. For example, the listing 212 is sorted such that the AVs with a greatest quantity of detections are displayed a top of the list 212.

Figure 3:
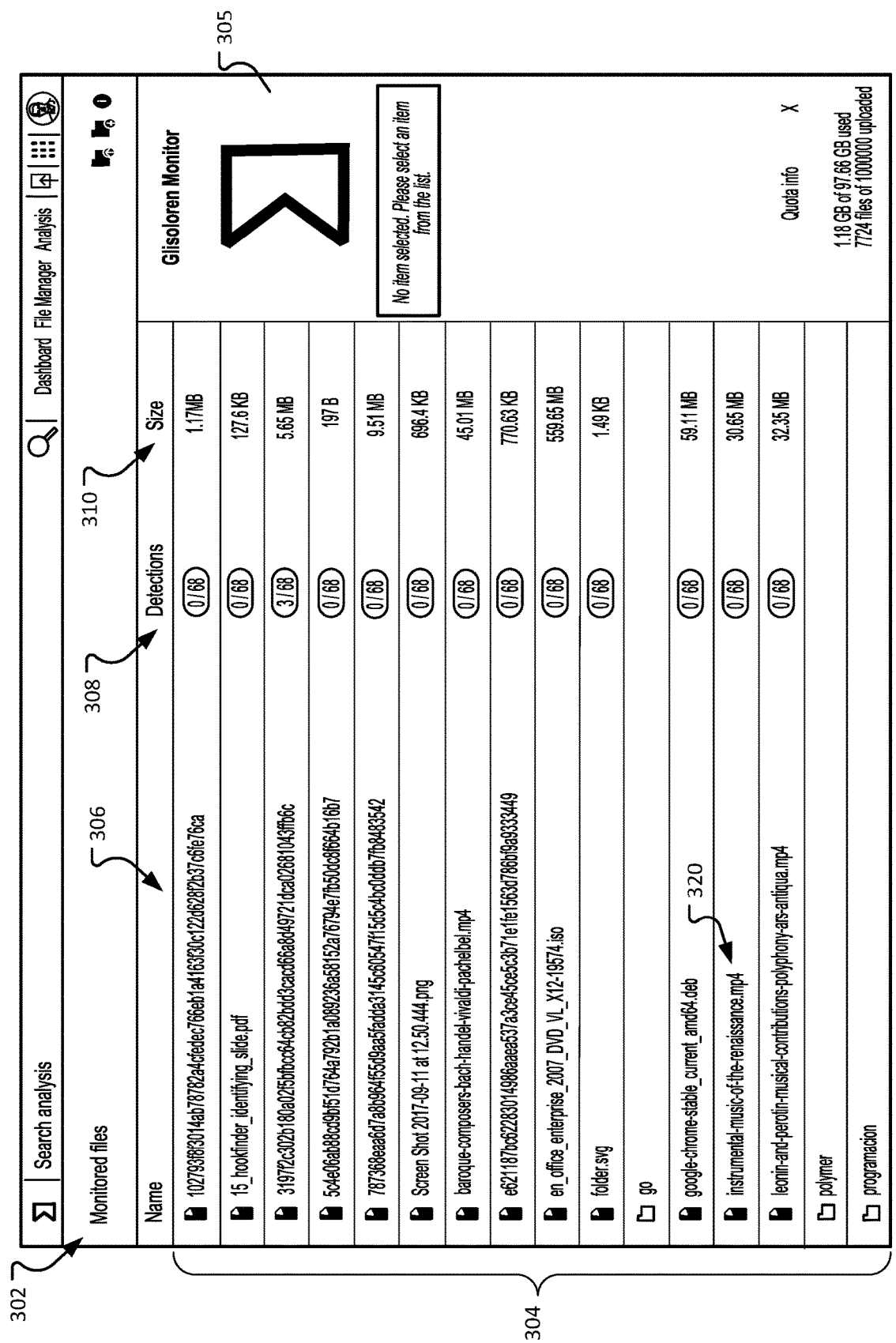

FIG. 3 illustrates a GUI of a monitored files interface 302 provided to the client computing device 104 for display. The monitored files interface 302 includes a listing 304 of the files included by the folder 112 and an additional data portion 305.

The listing 304 includes, for each file of the folder 112, a name portion 306, a detections portion 308, and a size portion 310. The name portion 306 provides data displaying a name of each file; the detections portion 308 provides data displaying, for each file, a number of AVs (e.g., the AVs 116) detecting the file as potentially malicious; and the size portion 310 provides data displaying a storage size of each file. For example, for a file 320, the name portion 306 displays "instrumental-music-of-the-renaissance-.mp4;" the detections portion 308 displays "0/68"—indicating that zero AVs have detected the file 320 as potentially malicious; and the size portion 310 displays "30.65 MB" as the size of the file 320.

Figure 4:
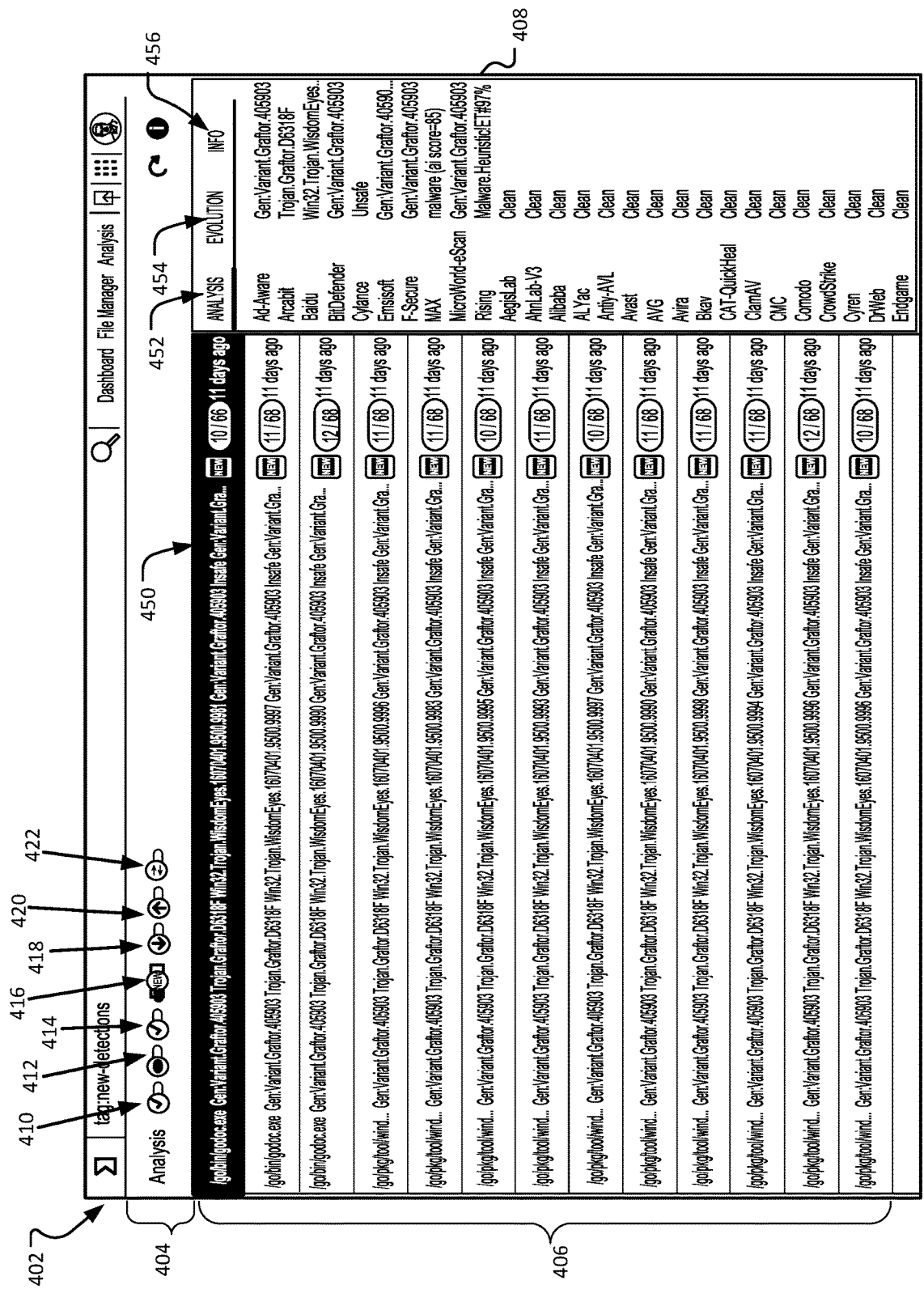
Figure 5:
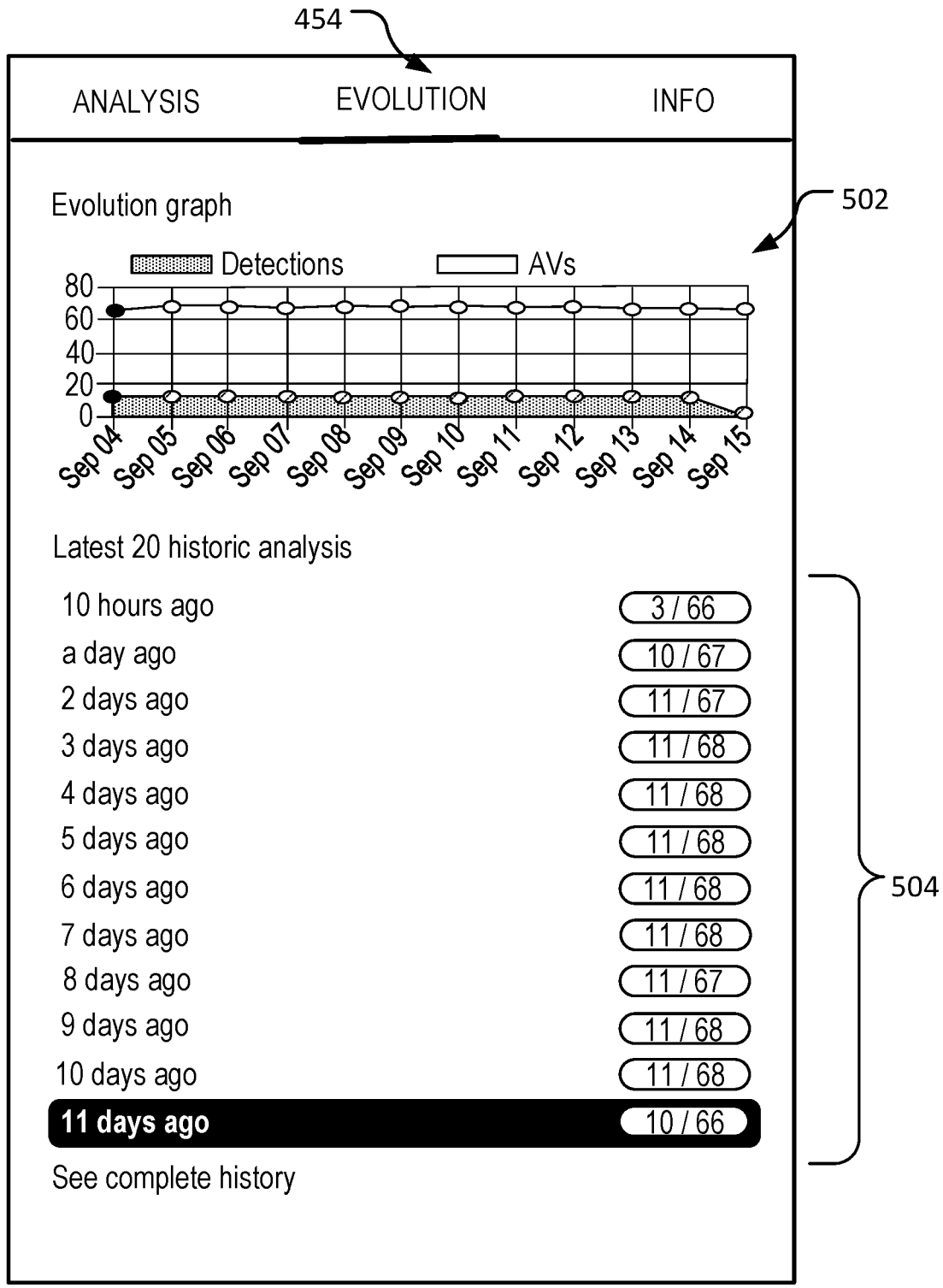
Figure 6:

The additional data portion 305 provides display of data relating to additional data for a selected file of the listing 304, described further in FIGS. 4, 5, and 6.

FIG. 4 illustrates a GUI of an analysis interface 402 provided to the client computing device 104 for display. The analysis interface 402 includes a filtering portion 404, a listing 406, and an additional data portion 408. The listing 406 includes files included by the folder 112 (or a subset of the files) subject to any filtering, described further herein.

The filtering portion 404 includes several interface elements, that when selected, toggle the filtering of files of the folder 112 that are displayed in the listing 406 based on a status of each file. The interface elements of the filter portion 404 include a malicious detection filter 410, a watching filter 412, a safe detection filter 414, a new detection filter 416, a trending down detection filter 418, a trending up detection filter 420, and a steady detection filter 422.

When the malicious detection filter 410 is selected, the listing 406 is updated to include files of the folder 112 that are indicated as potentially malicious by one or more AVs (e.g., the AVs 116). Further, when the watching filter 412 is selected, the listing 406 is updated to include files of the folder 112 that have been indicated of interest (e.g., a user has selected specific files of the folder 112); when the safe detection filter 414 is selected, the listing 406 is updated to include files of the folder 112 that are indicted as safe by one or more AVs (e.g., the AVs 116); when the new detection filter 416 is selected, the listing 406 is updated to include files of the folder 112 that were recently indicated as potentially malicious by one or more AVs (e.g., the AVs 116); when the trending down detection filter 418 is selected, the listing 406 is updated to include files of the folder 112 that have a detection count (e.g., number of AVs detecting the file as potentially malicious) that has decreased with respect to a previous scan; when the trending up filter 420 is selected, the listing 406 is updated include files of the folder 112 that have a detection count (e.g., number of AVs detecting the file as potentially malicious) that has increased with respect to a previous scan; and when the steady detection filter 422 is selected, the listing 406 is updated include files of the folder 112 that have a detection count (e.g., number of AVs detecting the file as potentially malicious) that has maintained substantially the same with respect to a previous scan.

The additional data portion 408 provides display of data related to additional data of a selected file 450 of the listing 406. In some examples, the additional data portion 408 includes an analysis tab 452, an evolution tab 454, and an information tab 456. As show in FIG. 4, the analysis tab 452, when selected, displays data indicating the particular AVs (e.g., the AVs 116) that have indicated the selected file 450 as potentially malicious and the particular AVs that have indicated the selected file 450 as safe (e.g., "clean"). As shown in FIG. 5, the evolution tab 454, when selected, displays data indicating a historical trend of the potential malware status of the selected file 450. In particular, the evolution tab 454 includes an evolution graph 502 and a listing 504. The evolution graph 502 is a graphical depiction of the number of AVs, over a time period, that have indicated the selected file 450 as potentially malicious and the total number of AVs that have scanned the selected file 450. The listing 504 is a historical depiction of the number of AVs that have indicated that the selected file 450 as potentially malicious for multiple time periods (e.g., each day). As shown in FIG. 6, the information tab 456, when selected displays data, e.g., metadata, of the selected file 450, including a name, size, creator, last analysis (scan), last analysis (scan) detection, location, details, and analysis frequency of the selected file 450.

Figure 7:
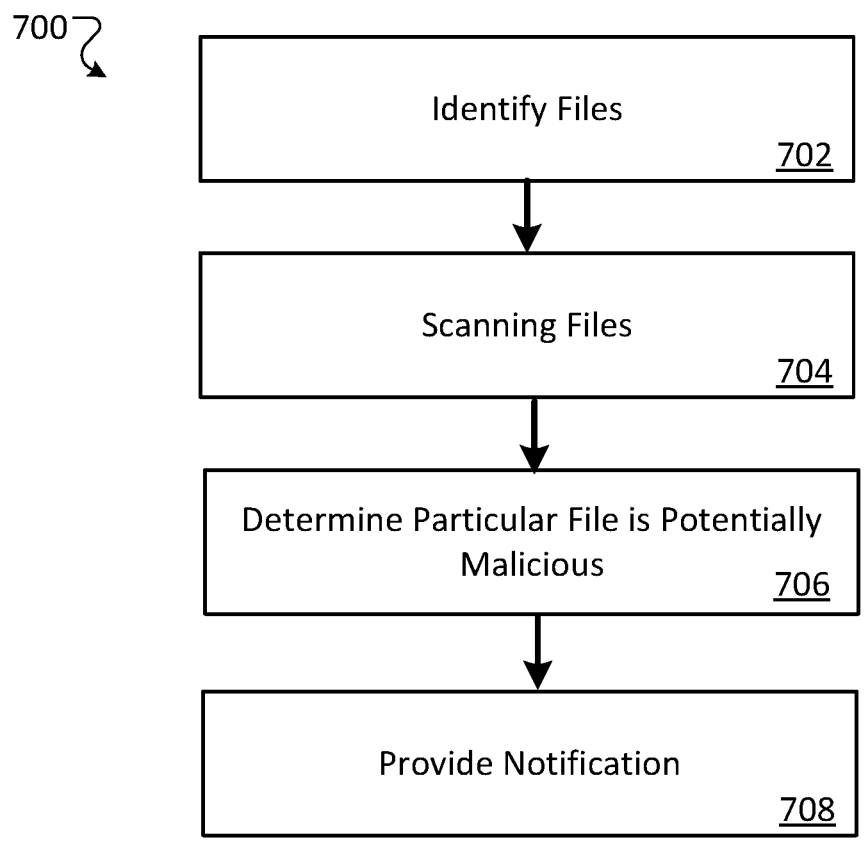
FIG. 7 is a flow chart of an example process for scanning of files for identification of potential malware.

FIG. 7 illustrates an example process 700 for scanning of files for identification of potential malware. The process 700 can be performed, for example, by the system 100 of FIG. 1, or another data processing apparatus. The process 700 can also be implemented as instructions stored on computer storage medium, and execution of the instructions by one or more data processing apparatus cause the one or more data processing apparatus to perform some or all of the operations of the process 700.

A plurality of files that have been uploaded by a user are identified (702). For example, the server computing system 102 identifies the files 114 stored within the particular folder 112 of the data store 108. In some examples, the files are uploaded by a user to a particular folder that has been allocated to the user in a file storage service. For example, the client computing device 104 access a portal (e.g., via a client-specific web page) to provide (e.g., upload) the files 110 to the folder 112 of the data store 108. Each of the plurality of files are scanned using each of a plurality of antivirus software programs (704). For example, each of the computing units 106 scans each of the files 114 using the respective AV 116. In response to the scanning, it is determined that a particular file of the plurality of files is indicated as potentially malicious by a particular antivirus software program of the plurality of antivirus software programs (706). For example, the server computing system 102 determines that particular file of the files 114 is indicated as potentially malicious by a particular AV 116. A notification is provided to a vendor of the particular antivirus software program indicating that the particular file has been indicated as potentially malicious by the particular antivirus software program (708). For example, the server computing system 102 provides the notification 130 to the computing device 106, and in particular, the vendor 118 of the particular AV 116 that indicated the particular file as potentially malicious.

Figure 8:
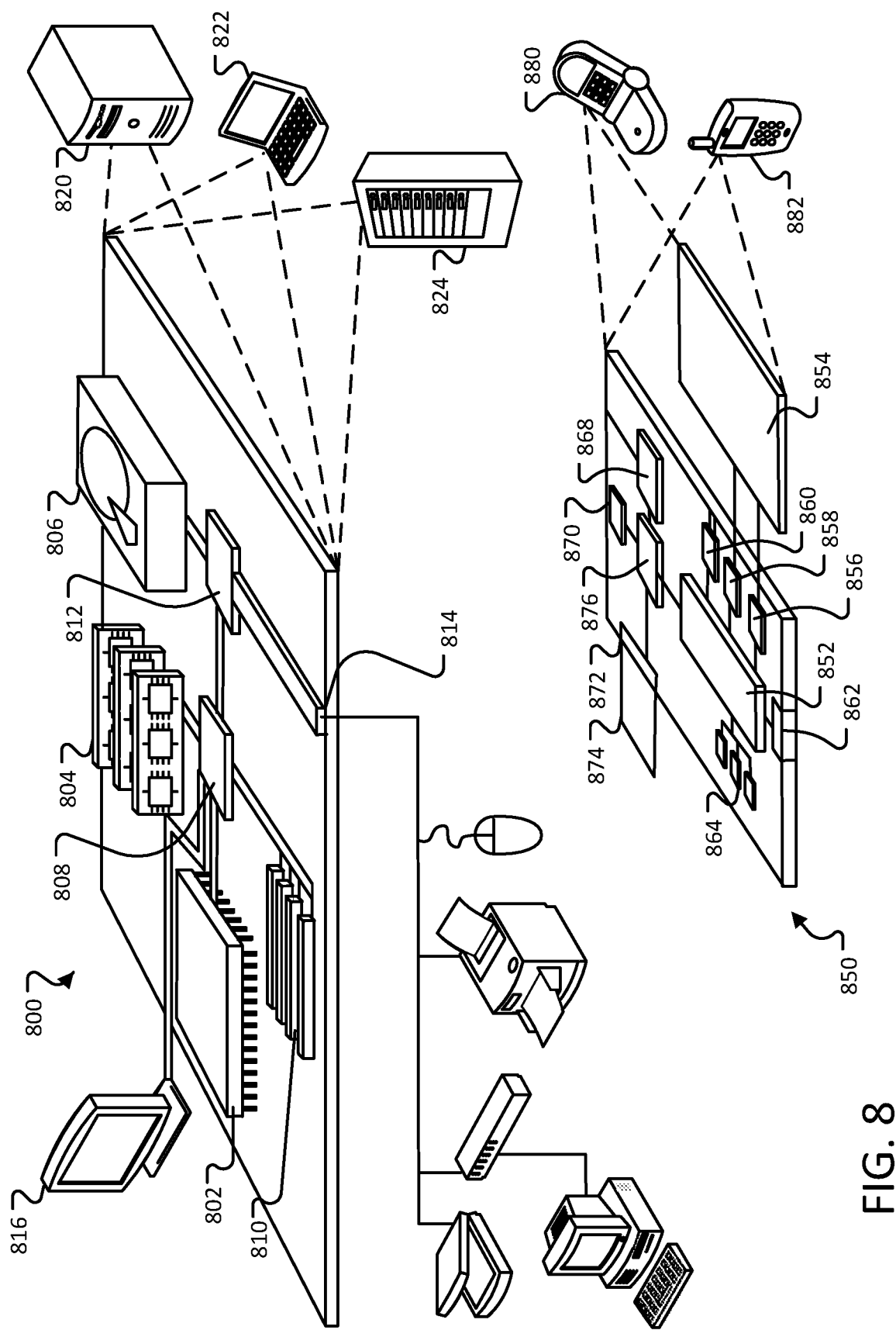
FIG. 8 is a block diagram of an example computing system.

FIG. 8 shows an example of a generic computer device 800 and a generic mobile computer device 850, which may be used with the techniques described here. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 may process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 804, the storage device 806, or a memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 668, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 may execute instructions within the computing device 840, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 848 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 may be implemented as one or more of a computer-readable medium or media, a volatile memory unit or units, or a non-volatile memory unit or units. Expansion memory 854 may also be provided and connected to device 850 through expansion interface 852, which may include, for example, a SIMM (Single In Line Memory Module) card interface. Such expansion memory 854 may provide extra storage space for device 850, or may also store applications or other information for device 850. Specifically, expansion memory 854 may include instructions to carry out or supplement the processes described above, and may include secure information also. Thus, for example, expansion memory 854 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 854, memory on processor 852, or a propagated signal that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 850 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 660 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 680. It may also be implemented as part of a smartphone 882, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method comprising:
   identifying, by a file analysis system, a plurality of files that have been uploaded by a user to a particular folder that has been allocated to the user in a file storage service;
   scanning, by the file analysis system, each of the plurality of files using each of a plurality of antivirus software programs;
   for at least one particular file:
      in response to the scanning, determining that the particular file of the plurality of files is indicated as potentially malicious by only one particular antivirus software program of the plurality of antivirus software programs;
      in response to determining that the particular file is indicated as potentially malicious by the only one particular antivirus software program, providing a notification to a vendor of the particular antivirus software program indicating that the particular file has been potentially anomalously indicated as potentially malicious by the particular antivirus software program;
   for at least a second file different from the particular file:
      in response to the scanning, determining that the second file of the plurality of files is not indicated as potentially malicious by only one particular antivirus software program of the plurality of antivirus software programs; and
      in response to determining that the second file is not indicated as potentially malicious by only one particular antivirus software program, not providing the notification to any vendors indicating that the second file has been potentially anomalously indicated as potentially malicious.

2. The method of claim 1, wherein the notification further includes metadata associated with the particular file.

3. The method of claim 1, further comprising:
   in response to the scanning, determining a status of the particular file that is indicated by the remaining antivirus software programs of the plurality of antivirus software programs.

4. The method of claim 3, wherein the notification further includes data indicating the status of the particular file for at least a subset of the remaining antivirus software programs.

5. The method of claim 1, further comprising:
   determining that the plurality of files have finished uploading to the particular folder, wherein identifying the plurality of files and scanning each of the plurality of files is in response to determining that the plurality of files have finished uploading to the particular folder.

6. The method of claim 1, wherein the scanning is performed periodically with a most recent signature for each antivirus software program.

7. The method of claim 1, further comprising providing an additional notification to the user associated with the particular folder indicating that the particular file has been indicated as potentially malicious by the particular antivirus software program.

8. The method of claim 1, wherein scanning further includes scanning, by the file analysis system, each of the plurality of files using each of the plurality of antivirus software programs at a first time, wherein each of the plurality of antivirus software programs utilize, at the first time, a respective initial signature for scanning each of the plurality of files.

9. The method of claim 8, further comprising:
   receiving a second notification from the vendor of the particular antivirus software program that the indication of the particular file as potentially malicious by the particular antivirus software program is a false-positive indication;
   in response to the second notification, re-scanning, by the file analysis system at a second time subsequent to the first time, the plurality of files using each of the plurality of antivirus software programs, wherein the particular antivirus software program utilizes, at the second time, an updated signature for scanning each of the plurality of files; and
   in response to the re-scanning, determining that the particular file is indicated as not potentially malicious by each of the plurality of antivirus software programs.

10. The method of claim 9, further comprising:
    in response to the re-scanning, storing data that identifies the particular file is indicated as safe by each of the plurality of antivirus software programs.

11. The method of claim 1, further comprising:
    providing for display a graphical user interface (GUI) to a computing device associated with the user, the GUI providing display data indicating a potential malware status of a subset of files of the plurality of files of the folder; and
    wherein the data indicating the potential malware status of the subset of files further includes, for each file of the subset, data indicating the antivirus software programs that indicate the file as potentially malicious.

12. The method of claim 11, wherein the data indicating the potential malware status of the subset of files further includes, for each file of the subset, a listing of the antivirus software programs that indicate the file as potentially malicious.

13. The method of claim 11, wherein the data indicating the potential malware status of the subset of files further includes, for each file of the subset, a listing of the remaining antivirus software programs that indicate the file as safe.

14. The method of claim 11, wherein the data indicating the potential malware status of the subset of files further includes, for each file of the subset, a historical trend of the potential malware status of the file.

15. The method of claim 11, wherein the GUI further provides filtering graphical user interface elements to toggle filtering of the files based on the status of each file.

16. The method of claim 11, wherein the data indicating the antivirus software programs that indicate the file as potentially malicious comprises data indicating a number of the antivirus software programs that indicate the file as potentially malicious.

17. A computer-implemented method comprising:
identifying, by a file analysis system, a plurality of files that have been uploaded by a user to a particular folder that has been allocated to the user in a file storage service;
scanning, by the file analysis system, each of the plurality of files using each of a plurality of antivirus software programs;
for at least one particular file:
in response to the scanning, determining that the particular file of the plurality of files is indicated as potentially malicious by only one particular antivirus software program of the plurality of antivirus software programs;
in response to determining that the particular file is indicated as potentially malicious by the only one particular antivirus software program, providing a notification to a vendor of the particular antivirus software program indicating that the particular file has been potentially anomalously indicated as potentially malicious by the particular antivirus software program;
for at least a second file different from the particular file:
in response to the scanning, determining that the second file of the plurality of files is not indicated as potentially malicious by only one particular antivirus software program of the plurality of antivirus software programs;
in response to determining that the second file is not indicated as potentially malicious by only one particular antivirus software program, not providing the notification to any vendors indicating that the second file has been potentially anomalously indicated as potentially malicious;
providing for display a graphical user interface (GUI) to a computing device associated with the user, the GUI providing display data indicating a potential malware status of a subset of files of the plurality of files of the folder; and
wherein the GUI further provides display of a listing of a subset of the files indicated as potentially malicious, the listing sorted by a date of initial detection of each of the subset of files as potentially malicious.

18. A computer-implemented method comprising:
identifying, by a file analysis system, a plurality of files that have been uploaded by a user to a particular folder that has been allocated to the user in a file storage service;
scanning, by the file analysis system, each of the plurality of files using each of a plurality of antivirus software programs;
for at least one particular file:
in response to the scanning, determining that the particular file of the plurality of files is indicated as potentially malicious by only one particular antivirus software program of the plurality of antivirus software programs;
in response to determining that the particular file is indicated as potentially malicious by the only one particular antivirus software program, providing a notification to a vendor of the particular antivirus software program indicating that the particular file has been potentially anomalously indicated as potentially malicious by the particular antivirus software program;
for at least a second file different from the particular file:
in response to the scanning, determining that the second file of the plurality of files is not indicated as potentially malicious by only one particular antivirus software program of the plurality of antivirus software programs;
in response to determining that the second file is not indicated as potentially malicious by only one particular antivirus software program, not providing the notification to any vendors indicating that the second file has been potentially anomalously indicated as potentially malicious;
providing for display a graphical user interface (GUI) to a computing device associated with the user, the GUI providing display data indicating a potential malware status of a subset of files of the plurality of files of the folder; and
wherein the GUI further provides display of a listing of each of the plurality of antivirus software programs, the listing sorted by a quantity of detections of files indicated as potentially malicious by each antivirus software program.

19. A system comprising:
one or more computers and one or more storage devices storing instructions that are operable, when executed by the one or more computers, to cause the one or more computers to perform operations comprising:
identifying, by a file analysis system, a plurality of files that have been uploaded by a user to a particular folder that has been allocated to the user in a file storage service;
scanning, by the file analysis system, each of the plurality of files using each of a plurality of antivirus software programs;
for at least one particular file:
in response to the scanning, determining that the particular file of the plurality of files is indicated as potentially malicious by only one particular antivirus software program of the plurality of antivirus software programs;
in response to determining that the particular file is indicated as potentially malicious by the only one particular antivirus software program, providing a notification to a vendor of the particular antivirus software program indicating that the particular file has been potentially anomalously indicated as potentially malicious by the particular antivirus software program;
for at least a second file different from the particular file:
in response to the scanning, determining that the second file of the plurality of files is not indicated as potentially malicious by only one particular antivirus software program of the plurality of antivirus software programs; and
in response to determining that the second file is not indicated as potentially malicious by only one particular antivirus software program, not providing the notification to any vendors indicating that the second file has been potentially anomalously indicated as potentially malicious.

20. A non-transitory computer-readable medium storing software comprising instructions executable by one or more computers which, upon such execution, cause the one or more computers to perform operations comprising:
    identifying, by a file analysis system, a plurality of files that have been uploaded by a user to a particular folder that has been allocated to the user in a file storage service;
    scanning, by the file analysis system, each of the plurality of files using each of a plurality of antivirus software programs;
    for at least one particular file:
        in response to the scanning, determining that the particular file of the plurality of files is indicated as potentially malicious by only one particular antivirus software program of the plurality of antivirus software programs;
        in response to determining that the particular file is indicated as potentially malicious by the only one particular antivirus software program, providing a notification to a vendor of the particular antivirus software program indicating that the particular file has been potentially anomalously indicated as potentially malicious by the particular antivirus software program;
    for at least a second file different from the particular file:
        in response to the scanning, determining that the second file of the plurality of files is not indicated as potentially malicious by only one particular antivirus software program of the plurality of antivirus software programs; and
        in response to determining that the second file is not indicated as potentially malicious by only one particular antivirus software program, not providing the notification to any vendors indicating that the second file has been potentially anomalously indicated as potentially malicious.

* * * * *